United States Patent Office 3,366,606
Patented Jan. 30, 1968

3,366,606
PREPARATION OF WATER SOLUBLE
N-METHYLOL POLYAMIDES
Max Eugene Chiddix, Easton, Pa., and James Louis McPherson, Midlothian, Ill., assignors to General Aniline & Film Corporation, New York, N.Y., a corporation of Delaware
No Drawing. Filed June 10, 1964, Ser. No. 374,175
9 Claims. (Cl. 260—72)

The present invention relates to an improved method of preparing water soluble N-methylol polyamides. It has general application also to the preparation of polyamides of the polypyrrolidone, nylon 6, and nylon 6,6 types.

In the prior art it has been suggested that the N-methylol derivatives of nylon type polyamides may be made by reaction of such polyamides with formaldehyde, using formic acid as a catalyst. It has been suggested that such derivatives may be synthesized in a non-solvent system, employing greater than normal pressure and higher temperatures in a basic non-aqueous medium. Thus, in U.S. Patent 2,393,972, there is disclosed a process for preparing N-methylol polyamides using formic acid as a solvent. Also, in U.S. Patent 2,443,486 a method is described for preparing similar compounds in the presence of a basic medium.

It has also been suggested, as in U.S. Patent 2,734,004, that an N-methylol polypyrrolidone may be prepared using 70% glycolic acid as a solvent and catalyst. The latter reference also raises some question as to the operability of the formic acid process. In any case, the prior art processes have not been entirely satisfactory and, moreover, simpler or more economical methods are much needed.

It has now been discovered that N-methylol polypyrrolidone may be prepared by a simplified and improved process which includes heating an aqueous formaldehyde solution of the polypyrrolidone for such a time as is required till solution of the polymer occurs. Thereafter, the polymer may be separated and precipitated, either by pouring this solution into acetone, or by removing the water and the excess formaldehyde by distillation, or by spray drying.

The method of the present invention involves the use of moderate temperatures and a reaction medium of mild or near neutral pH value. Since an aqueous solvent is employed, the inherent degradation of the polyamide, which normally occurs when it is heated in the presence of an acid, is avoided. The present method also avoids certain difficulties encountered in working up the product of the previous methods. The finished product is easily worked up free of color and is processed with very little if any degradation, as far as has been observed and as tested by relative viscosity. Apparently the procedures of this invention convert many of the amides groups of the polyamide to N-methylol groups;

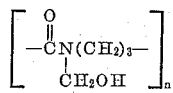

According to the present method, the aqueous formaldehyde solution with the polypyrrolidone is heated over a moderate temperature range, within the limits of about 85 to 200° C. The solution preferably has a mild pH, ranging between 3 and 10, preferably between 3.5 and 8. The ratio of formaldehyde to polypyrrolidone may be varied between about 0.5:1 to 5:1. The preferred ratio is between about 2:1 and 3:1 of formaldehyde to polypyrrolidone. These ratios are by weight. The concentration of aqueous formaldehyde which is employed can be anywhere between about 10 and 50% but is preferably between about 20 and 37%. The products which are prepared by this method may have a percentage of nitrogen substitution ranging from less than 1% to greater than 80%. Preferred substitution percentages usually will be between about 5 and 70%. Other things being equal, greater substitution occurs with more stringent processing conditions, that is, higher temperatures, pressures and concentrations.

A second part of this invention is the discovery of the extreme ease with which the N-methylol polypyrrolidone can be converted back to polypyrrolidone or to a polymer having a low percentage of N-methylol groups. Transformation to a mixture of polypyrrolidone and N-methylol polypyrrolidone containing less than 2.5% nitrogen substitution occurs readily at room temperature when the pH of the aqueous solution is raised from 3.5 up to a neutral or slightly alkaline value. Consequently, the polymer should be worked up under slightly acid conditions to avoid this transformation and it is preferred that the pH be kept between 3 and 7. At the same time, strong acid conditions should be avoided to prevent cross-linking of the polymer. Apparently, failure in the past to recognize some of these factors may have militated against full success of the prior art methods, such as those disclosed in U.S. Patents 2,393,972 and 2,734,004, for example.

Inasmuch as polypyrrolidone is soluble in only a few chemicals such as acids and phenols, which are often undesirable solvents, the present method has the further advantage of extending the solubility and broadening the usefulness of the products. In particular, a water soluble chemically modified polypyrrolidone has been prepared. The products also are generally soluble in alcohol.

The N-methylol polypyrrolidone of this invention can be converted to films which are clear and have a very tough to rubbery texture. They can be made water soluble to certain degrees when this is desirable or they may be made completely insoluble, e.g., by cross-linking. The percentage of nitrogen substitution, as suggested above, may range from about 1 to 80%. Solubility in water may range from less than 1 part per 100 parts of water to more than 100 parts. Solubility in 95% ethyl alcohol may range from 1 part or less per 100 parts of alcohol to as much as 50 parts. Polymers made by this method can be formed into clear, tough, flexible films, coatings, fibers, etc. After formation, these products may be made insoluble to methanol, water, etc. and may also be made relatively infusible either by acid cross-linking or by heating.

A normal method of acid cross-linking consists of adding 3 to 10% acid (as maleic acid, succinic acid, oxalic acid, adipic acid, acetic acid, or benzoic acid) to the polymer. This is followed by heating for 2 to 30 minutes at a temperature within the range of about 100 to 140° C. However, if desired, the material may be merely dried at room temperature. The cross-linked polymer is stiffer than the unlinked material and is insoluble in practically all known solvents. Stronger acids such as para-toluenesulfonic acid also may be employed, using a lower temperature and a shorter heating time, to accomplish cross-linking. Preferred conditions for acid cross-linking are to heat the polymer, preferably containing about 3 to 10% by weight of dibasic carboxylic acid, such as the preferred maleic acid, at a temperature of about 100° for about 40 to 60 minutes.

Films prepared by the foregoing method have reasonably good water absorption properties. They also have a comfortable feel similar to that of leather and in sharp contrast to the feel of the common unaltered polyamides of the prior art. When used as coatings these materials have excellent anti-static properties. For example, a Dacron fabric coated with N-methylol polypyrrolidone made according to this invention gave it a resistivity of 11.9 log ohm per square at 40% relative humidity which is better than that for normally processed cotton.

The products of this invention also have excellent dyeability. Since they can readily be rendered insoluble by cross-linking they have potential uses as fabric or floor coatings or for use as binding agents in artificial leathers and in nylon paper. In the latter case they may replace the presently used N-methoxymethyl nylon 6,6. The present invention also contemplates a new and improved method of regenerating polypyrrolidone from the N-methylol polypyrrolidone. Films or formed objects may be so treated. This method consists of raising the pH of an aqueous solution of the polymer to 7 or above or in heating the polymer in water or both. The effect of this is that the formerly water soluble polymer rapidly becomes insoluble in water and precipitates. It is then insoluble in water or alcohol, but remains reasonably soluble in 1:1 acetic acid and water. Analysis has shown the product so treated to be essentially polypyrrolidone with a very low content of substituted N-methylol polypyrrolidone. Films which were cast from 1:1 acetic acid-water proved to be clear, tough and flexible. They were also insoluble in water and alcohol and mixtures thereof and were found to be resistant to degradation by boiling water.

The polymer insolubilized by increasing the pH, as just described, is very stable chemically and can be molded in a manner similar to that employed for molding normal polypyrrolidone. It has an increased stability but a lower melting point than the pure polypyrrolidone. Such materials are obviously very useful as adhesives and are very strongly bonded to most materials, including glass. They may be used also as bonding agents for fibrous materials, e.g., as coatings for fibers such as rayon cord for example. They impart high abrasive resistance to fabrics and have high melting points, typical of the properties of nylon. As a fabric protective coating they may be employed on clothes together with tints for giving decorative effects. They may be employed to increase the tear strength of resin treated rayon and other fabrics. As a coating for leather, paper, etc., the new products are useful to give surface effects similar to normal nylon properties and to impart good internal strength to such materials as artificial leather, nylon paper and the like.

The insoluble polyamide can also be regenerated by heating the polymer to a temperature in excess of 110° C. This process makes it possible to fabricate articles such as film coatings, etc., which require a solubility of the polymer in some practical solvent as water-alcohol and then to be able to regenerate the starting polyamide after the object is in its final form. The process thus gives the final product all of the good properties such as high melting points, insolubility, high abrasive resistance, and strength properties that only the unaltered polyamide ordinarily possesses.

The N-methylol polypyrrolidone products of this invention are useful also for molding gaskets. This is true particularly of the highly substituted products having a melting point lower than the decomposition temperature of the polymer, for example, around 120° C. They are useful as dye carriers per se as well as for coatings of fabrics and glass fiber. They may be used for coatings for nylon hose where they impart a better feel, greater strength, and improved water absorption. In fact, they may be used for coating nylon materials in general. They are useful for upholstery backings, as warp sizes for nylon, Dacron and similar fibers.

The polymers of this invention also may be used for making foamed products when the high methylol substituted polypyrrolidone is placed in a mold and heated above about 120° C. or at a lower temperature under vacuum. The fibers also may be spun from the concentrated aqueous solutions or from other solvents such as formic acid solutions. These fibers are tough but somewhat elastic.

The invention will be more fully understood by reference to the following specific examples.

EXAMPLE 1

To a 1000 ml. three-necked, round bottom flask equipped with a stirrer, dropping funnel, and a reflux condenser, and means of heating, was added 210 parts of 90% formic acid and 60 parts of polypyrrolidone (the relative viscosity was 2.23 measured as a 0.5% solution in meta-cresol). After 10 minutes of stirring, the polypyrrolidone had dissolved. The temperature was maintained at 40° C. and a solution, also at 40° C., of 60 parts of formaldehyde in 103 parts of water (148 parts of commercial 36.86% aqueous formaldehyde solution) was added over an eight minute period. Three minutes later 50 parts of water at 40° C. was added. The flask was immersed in an ice bath and the reaction product was kept at ice bath temperature during the rest of the work-up procedure.

The reaction product was poured into 1200 ml. of 1:1 acetone-water and base (NaOH) was added to neutralize the formic acid and to raise the pH to 7. This solution was poured into 2 liters of acetone and the precipitated polymer was cut and then dried in a vacuum oven at 60° C. for 17 hours at 1 mm. pressure to give 54 parts of a white solid.

The solubility of the resulting product was 5 g./100 g. water. The relative viscosity was 1.27 measured as 0.5% in meta-cresol and the percent by weight of —$CH_2OH$ was 2.18 which corresponds to a substitution of 15% of the nitrogen atoms. The free formaldeyhe ($CH_2O$) was determined by treating a solution of the polymer in 50% aqueous methanol with dimethyldihydroresorcinol followed by titration of the excess reagent with NaOH.

The combined formaldehyde ($CH_2OH$) was determined by treating a solution of the polymer in 50% aqueous methanol with Tollens' Reagent and subtracting the free formaldehyde previously determined from this total. This method was found to be more accurate than the sulfite method.

The product apparently cannot be obtained by the procedure of the prior art as described, for example, in U.S. Patent 2,393,972. It appears to be necessary to maintain the reaction product at ice-bath temperature immediately after the reaction and during the work-up procedure. To prevent acid cross-linking of the polymer, it is necessary apparently, to add the reaction product to acetone and water and then immediately to raise the pH to slightly acid or neutral. If the pH of the solution of N-methylol polypyrrolidone is raised to the alkaline range precipitation and insolubilization of the polymer immediately occurs. In such case N-methylol polypyrrolidone is transformed primarily to insoluble polypyrrolidone with a very low content of substituted N-methylol polypyrrolidone. Furthermore, if the reaction itself is run at a temperature greater than 40° C. acid cross-linking takes place. For example, if the reaction is run at 60° C. for 8 minutes complete acid cross-linking takes place.

The present invention, by contrast, provides a novel, easy and practical method for making polyamides which are water-soluble through the N-methylol derivative, and avoids the expense and isolation difficulties of a procedure involving an acid such as formic acid or glycolic acid.

EXAMPLE 2

To a 1000 ml. three-necked round bottom flask equipped with a stirrer and condenser, and heated on a steam bath, was added 186 parts of formaldehyde in 318 parts of water (504 parts of commercial 36.86% aqueous formaldehyde solution —pH 3.5) and 41.7 parts of polypyrrolidone ($\pi$=2.24 measured as 0.5% in meta-cresol). After 70 minutes of heating on the steam bath, an almost clear solution (pH 4.9) resulted. This was cooled, filtered, and poured into two liters of stirred acetone. The precipitated polymer was dried at 60° C. for 17 hours at 1 mm. pressure to give 45.6 parts of a white solid. The solubility was 100 g./100 g. of water and 25 g./100 g. of methyl alcohol with a cloud point at 62° C. in water. The relative viscosity was 2.46 (measured as 0.5% in meta-cresol) and the percentage by weight of $CH_2OH$ was 14.51 which corresponds to a substitution of 72% of the nitrogen atoms. A stick point (the temperature at which a piece of the polymer sticks when pressed against a hot melting point block) was 128° C.

Films cast from water or alcohol were clear, tough, flexible, and somewhat rubbery and were water- and alcohol-soluble. Clear, tough, and flexible alcohol and water insoluble films were prepared by incorporating 5% by weight of an acid, such as maleic acid, in the polymer solution, followed by allowing the film to air dry at room temperature.

EXAMPLE 3

The procedure was identical to Example 2 except that the aqueous formaldehyde and polypyrrolidone reaction product was worked up by diluting with 1 vol. of water or alcohol to give a solution of 6–10% by weight of polymer, and running it through a spray dryer (Bowen-Serial No. BE96, Eng'r Inc., Garwood, N.J.) which was 30 inches in diameter x 30 inches high, direct gas fired, and equipped with an air turbine manufactured by the Ansrup Machine Works with 50,000 r.p.m. and a temporary controller on the gas. The intake temperature was 320° F. and the top wall temperature was 100° C. (must be kept below the stick point temperature of the polymer to be spray dried). There was obtained an almost quantitative yield of a white colored solid similar to Example 2.

EXAMPLE 4

The procedure was identical to Example 2 except that the aqueous formaldehyde-polypyrrolidone reaction product was worked up by removing most of the formaldehyde by steam distillation and the water by distillation. The product was dried in a vacuum oven overnight at 60° C./1 mm. to give a white colored solid with a solubility of 50 g./100 g. hot water similar to the product of Example 2 except with a considerably lower percent by weight of —$CH_2OH$ (6.5% which corresponds to a substitution of 37% of the nitrogen atoms).

EXAMPLE 5

To a 1000 ml. stainless steel autoclave equipped with a stirrer, cold finger, and external heating unit was added 41.7 parts of polypyrrolidone ($\pi$=2.24 measured as 0.5% meta-cresol), 41.7 parts of formaldehyde as 103.5 ml. of 36.86% aqueous solution and 251 parts of water (pH 3.5). The mixture was heated at 160° C. for 16 minutes. The clear liquid reaction product (pH 4.3) was spray dried to give an almost quantitative yield of white product containing 12.9% of —$CH_2OH$, which corresponds to a substitution of 63% of the nitrogen atoms. The relative viscosity $\pi$ of the resulting product was 1.66, measured as 0.5% in meta-cresol. The solubility was 100 g./100 g. of water.

EXAMPLE 6

To a 1000 ml. stainless steel autoclave equipped with a stirrer, cold finger, and an external heating unit was added 41.7 parts of polypyrrolidone ($\eta$=2.24 measured as 0.5% in metacresol), 186 parts of formaldehyde (461 ml. of 36.86% aqueous solution —pH 3.5) and 14.5 parts of a 10% $NH_4OH$ solution. The mixture was heated at 180° C. for 16 minutes. The reaction product was an almost clear solution with a pH 6.6. This material was poured into 1 liter of acetone, and the precipitate dried at 60° C. for 17 hours at 1 mm. pressure to give 34 parts of a fine white powder with a percentage —$CH_2OH$ of 3%, which corresponds to a substitution of 12.5% of the nitrogen atoms. The solubility in water was 5 g./100 g. of water. The relative viscosity was 1.33 (measured as 0.5% in meta-cresol), the stick point 184° C. and the M.P. 242–244° C.

EXAMPLE 7

To a 1000 ml. three necked, round bottom flask equipped with a stirrer, condenser, and heated on a steam bath was added 186 parts of formaldehyde in 318 parts of water (461 ml. of commercial 36.86% aqueous formaldehyde solution) titrated with $NaHCO_3$ solution to a pH of 6.5, 41.7 parts of polypyrrolidone ($\eta$=2.24 measured as 0.5% in meta-cresol), and 40 parts of triethanolamine. Upon heating for 15 minutes at 100° C. the polypyrrolidone went into solution. The mixture was heated a total of 1 hour and 15 minutes (pH 7.8), cooled to room temperature, filtered through glass wool and poured into 1000 ml. of acetone. After drying at 60° C. for 17 hours at 1 mm. pressure, there was obtained 26.1 parts of a slightly off-white colored solid with a percentage $CH_2OH$ of 8.4, which corresponds to a 46% substitution of the nitrogen atoms. $\eta$=2.20 measured as 0.5% concentration in meta-cresol, and a solubility of 100 g./100 g. of hot water.

EXAMPLE 8

To a 1000 ml. three-necked, round bottom flask equipped with a stirrer, condenser, and heated on a steam bath was added 186 parts of formaldehyde in 318 parts of water (461 ml. of commercial 36.86% aqueous formaldehyde solution, at pH 3.5), and 41.7 parts of polypyrrolidone ($\eta$=3.39 measured as 0.5% concentration in meta-cresol). The mixture was heated with stirring at 100° C. for 1 hour and 45 minutes, till solution of the polypyrrolidone occurred. Heating was continued for 2 hours after solution or for a total of 3 hours and 45 minutes.

The solution was diluted with 100 parts of water and filtered through glass wool and poured into 2 liters of acetone to give 39.5 parts of a white solid at 60° C. for 17 hours at 1 mm. pressure. The polymer contained 11.7% $CH_2OH$ which corresponds to 59% substitution of the nitrogen atoms. The solubility was 20 g./100 g. of hot water and the relative viscosity was 2.89 measured at 0.5% concentration in meta-cresol.

EXAMPLE 9

The procedure was identical to Example 8 except that a polypyrrolidone with $\eta$=4.96 measured as 0.5% in meta-cresol was used. The product was a white solid with 12% $CH_2OH$ which corresponds to 60% substitution of the nitrogen atoms. It had a solubility of 10 g./100 g. hot water and a relative viscosity of 4.49 measured as 0.5% in meta-cresol.

EXAMPLE 10

To a 1000 ml. stainless steel autoclave equipped with a stirrer, cold finger, and external heating unit was added 41.7 parts of Zytel 211 (nylon–6) with $\eta$=2.2 measured as 0.5% in meta-cresol, which had been Wiley mill ground to a coarse powder and 186 parts of formaldehyde in 318 parts of water (pH 3.5). The mixture was heated at 180° C. for 16 minutes. The reaction product was white mush in a clear liquid which cleared up upon addition of an equal volume of methanol. The pH was 4.3. The polymer was precipitated by pouring the solution into 2000 ml. of acetone. After drying there was obtained 32 parts of ivory colored solid. The relative viscosity was 1.22 measured as 0.5% in meta-cresol, and the percentage —$CH_2OH$ was 2.13, which corresponds to 9.8% substitution of the nitrogen atoms. The product had a solubility of 10 g./100 g. of 80% ethanol.

EXAMPLE 11

The procedure was identical to Example 10 except that Zytel 101 (nylon-6, 6) with $\eta=1.8$ measured as 0.5% in meta-cresol was used in place of Zytel 211 (nylon–6). The reaction product was similar but required two volumes of methanol for solution. The final white solid had a percentage —$CH_2OH$ of 4.49 which corresponds to 27% substitution of the nitrogen atoms, and a relative viscosity of 1.22 measured as 0.5% in meta-cresol. The product had a solubility of 7 g./100 g. of 80% ethanol.

EXAMPLE 12

Dacron fabric was dipped in a 6% by weight aqueous solution of N-methylol polypyrrolidone, with 79% of the nitrogen atoms substituted, containing 10% maleic acid on the weight of polymer. After drying at 23° C. for 17 hours, the coating on the fabric was water insoluble and the fabric had a resistivity of 11.11 log ohm/square at 40% relative humidity at 72° F.

When the Dacron fabric was dipped in the above polymer solution containing only 4% maleic acid and cured at 100° C. for 2 hours, the following results were obtained. Only 8% by weight of the polymer coating was removed by a standard washing machine cycle and sixty-eight percent of the methylol groups were removed in the cross-linking. The fabric had a resistivity of 11.4 log ohm/square at 40% relative humidity at 72° F. This compares with a value of 11.7 log ohm/square for cotton fabric and a value of 14+ for Dacron.

EXAMPLE 13

To a 3-liter, 3-necked, round-bottom flask equipped with stirrer and condenser was added 208.5 parts of powdered polypyrrolidone (relative viscosity=2.42 at 0.5% in m-cresol), and 2305 parts of 36.86% aqueous formaldehyde (930 parts of 100% formaldehyde). The mixture was stirred and heated on a steam bath for a total of 4.5 hours. At the end of this time all of the polymer had gone into solution. The slightly milky solution was filtered. One-half of the reaction solution was made alkaline with approximately 800 parts of concentrated ammonium hydroxide while keeping the temperature below 40° C. At the end, the pH of the solution was 10, and a white solid had precipitated. The mixture was allowed to stand two hours to complete the precipitation. The solid was then collected by filtration, washed with water and methanol, and dried under vacuum. A total of 132 parts of white solid melting at 254–258° C. was recovered. The analysis of the solid showed 0.4% methylol group using the method described in Example 1. The sample contained 0.27% free formaldehyde and 35% water. It was redried to a water content of 0.45%.

A portion of the dried white powder was pressed into a film in a Carver Press at 260° C. The film was clear and very tough. It was insoluble in boiling water but soluble in warm dilute acetic acid.

The other half of the reaction solution was poured into 2 liters of acetone with stirring. The precipitated polymer was washed with another 2 liters of acetone and dried at 60° C. under vacuum giving 130 parts of a white rubbery solid. This solid was soluble in cold water, and a film cast from aqueous alcohol was fairly tough but rubbery and very clear. Analysis of the solid showed 17.6% of —$CH_2OH$, 2.8% water, and 6.15% free formaldehyde. The total of free and combined formaldehyde was 23.8%. The relative viscosity measured at 0.5% in m-cresol was 2.34.

One part of this solid was dissolved in 10 parts of water, and the pH was found to be 4.6. The addition of 0.05 part of 1 N-sodium hydroxide brought the pH to 10.7. A white rubbery solid slowly precipitated on standing. Analysis showed that the total of free formaldehyde and —$CH_2OH$ was 12.5% for the solid. This procedure was repeated using ammonium hydroxide, and the precipitated white solid had a total formaldehyde content of 12.1% including both free and combined formaldehyde.

It is apparent from the above that methylol groups are readily removed from the polymer by simply raising the pH with base to about 10. When it is desired to remove all the methylol groups, enough base is used to consume most of the liberated formaldehyde. However, some removal of methylol groups can be affected by heating an aqueous solution of the N-methylol pyrrolidone without the addition of base.

The precipitated polymer from the first half of the solution treated with ammonium hydroxide has a methylol content of less than 1%, but this is sufficient to greatly increase the solubility of this polymer in 50% acetic acid. By contrast, the original polypyrrolidone is insoluble in this solvent. This provides a useful way to make a polyamide solution for use in coating textiles, paper, and leather since the original polyamide can be dissolved only in phenols or in strong acids such as formic acid or mineral acid.

Various other products and the conditions for their preparation are set forth in Tables I, II, and III.

TABLE I

| Example | Ratio Reactants[1] | ° C. | Time[2] (min.) | Percent— $CH_2OH$[3] | M.P. | Solubility g./100 g. water |
|---|---|---|---|---|---|---|
| 14 | [5] 60:60:210 | 40 | 35 | 4.9 | -------- | (4) |
| 15 | [6] 60:60:210 | 40 | 11 | 2.12 | 255 | 5 |
| 16 | [6] 60:60:210 | 40 | 22 | 1.7 | 250d | 10 |
| 17 | [6] 60:60:210 | 60 | 11 | -------- | Product Cross-Linked | |

[1] Parts by weight of formaldehyde to polypyrrolidone to 90% aqueous formic acid.
[2] Reaction time.
[3] Analysis for methylol substituents in the product
[4] The relative viscosity (0.5% in m-cresol) of this product was 1.2.
[5] The 60 parts of formaldehyde were first dissolved in 140 parts of water.
[6] The 60 parts of formaldehyde were added as 148.5 parts of 36.86% aqueous solution.

TABLE II (ACID pH)

| Example | Ratio Reactants [1] | Temp.[2] deg. | Time [2] | pH [3] | Visc.[4] | Percent—CH₂OH[5] | M.P.[6] | S.P [7] | Solubility, g./100 g. H₂O |
|---|---|---|---|---|---|---|---|---|---|
| 18 | 186:41.7 | 75 | 24 hrs | | | ([8]) | | | |
| 19 | 186:41.7 | 85 | | | | ([8]) | | | |
| 20 | 187:41.7 | 100 | 70 min | 3.5 | 2.46 | 15.5 | | 128 | 100 |
| 21 | 186:41.7 | 100 | 3 hrs | 4.5 | 2.10 | 17.2 | | 113 | 100 |
| 22 | 186:41.7 | 100 | 4 hrs | 5.1 | 2.31 | 18.5 | | 110 | 100 |
| 23 | 125:41.7 | 100 | 13 hrs | 4.7 | 1.88 | 18.9 | 253d | 140-143 | 100 |
| 24 | 186:41.7 | 100 | 24 hrs | 4.3 | 1.76 | 15.6 | | | 100 |
| 25 | 186:41.7 | 140 | 16 min | 4.5 | 1.91 | 12.9 | 248d | 142 | 100 |
| 26 | 186:41.7 | 160 | 16 min | 5.2 | 1.40 | 10.3 | 233 | 122 | 25 |
| 27 | 41.7:41.7 | 140 | 40 hrs | 5.3 | | ([8]) | | | |
| 28 | 41.7:41.7 | 140 | 16 min | 5.0 | 2.02 | 13.0 | 252 | | 100 |
| 29 | 41.7:31.7 | 140 | 60 min | 4.0 | 2.00 | 6.0 | 240 | 170 | [9] 5 |
| 30 | 41.7:41.7 | 160 | 16 min | 4.3 | 1.66 | 12.9 | 246 | | 10 |
| 31 | 20.8:41.7 | 140 | 60 min | 5.8 | | ([8]) | | | |
| 32 | 20.8:41.7 | 160 | 60 min | 4.8 | | ([8]) | | | |
| 33 | 20.8:41.7 | 180 | 16 min | 4.6 | | ([8]) | | | |

[1] Parts by weight of formaldehyde and polypyrrolidone, respectively. The reactants were dissolved in 318 parts of water.
[2] Reaction temperature,° C., and time.
[3] The pH of the reaction mixture at end of reaction.
[4] The relative viscosity measured at 0.5% in m-cresol.
[5] Analysis of product for methylol groups.
[6] Melting point,° C.
[7] The temperature at which a piece of the polymer sticks when pressed against a melting point block.
[8] The N-methylol substitution is less than 1% by weight of the polymer.
[9] Solubility in hot water.

TABLE III (ALKALINE pH)

| Example | Ratio Reactants [1] | Temp.,[2] deg. | Time [2] | pH [3] | Percent—CH₂OH [4] | S.P.,[5] ° C. | Solubility, g./100 g. H₂O |
|---|---|---|---|---|---|---|---|
| 34 | 186:41.7 | 33 | 11 hrs | 10.7 | ([6]) | | |
| 35 | 186:41.7 | 100 | 1 hr. 15 min | 8.0 | 14.2 | 109 | 100 |
| 36 | 186:41.7 | 180 | 16 min | 6.6 | 3.0 | 184 | [7] [8] [9] 5 |
| 37 | 41.7:41.7 | 100 | 24 hrs | 6.6 | ([6]) | | |
| 38 | 41.7:41.7 | 100 | 11 hrs | 8 | ([6]) | | |
| 39 | 41.7:41.7 | 100 | 11 hrs | 8 | ([6]) | | |

[1] Ratio of parts by weight of formaldehyde to polypyrrolidone. The reactants were dissolved in 318 parts of water.
[2] Reaction temperature and time.
[3] The pH of the reaction mixture at end of reaction.
[4] Analysis of product for methylol group.
[5] The temperature at which a piece of the polymer sticks when pressed against a melting point block.
[6] The N-methylol substitution is less than 1% by weight of the polymer.
[7] Solubility in hot water.
[8] The melting point was 242° C. (decomp.).
[9] The relative viscosity was 1.33 measured at 0.5% in m-cresol.

Results of various experiments are shown in the tables above. Table I shows the results of reactions in formic acid solution and the crosslinking produced at 60° C. Table II shows results of experiments in slightly acidic aqueous systems. Table III shows results obtained on the alkaline side. It can be seen that good conversions are obtained at pH's of 4 to 8.

It will be understood that the products of this invention have attractive commercial possibilities with properties that are superior in some respects to some of the modified nylon materials currently on the market. The extreme ease of insolubilization by merely raising the pH to the alkaline range, or by merely heating slightly above 120° C. even in the presence of an acid, suggests many new applications and uses in which speed and extreme ease of insolubilization are desirable or necessary. Its water solubility prior to cross-linking and the ease with which it may be insolubilized makes the productss of this invention especially interesting substitutes for certain of the modified nylons widely known in the prior art. The process is simple and economical and is, therefore, superior in many respects to those of the prior art. It will be obvious, however, that various modifications may be made in the process and in its products, as will occur to those skilled in the art. It is intended by the claims which follow to cover such variations, as far as the prior art properly permits.

What is claimed is:

1. The method of preparing water-soluble N-methylol polyamides which comprises heating at a temperature between 85° C. to 200° C. a reaction mixture consisting of a polyamide in an aqueous formaldehyde solution of 10% to 50% strength under pH conditions between 3.5 to 8.

2. The method of claim 1 wherein the N-methylol polyamide is recovered from the reaction mixture by removing the water and excess formaldehyde.

3. The method of claim 1 wherein the resulting N-methylol polyamide is precipitated from the reaction mixture by adding acetone.

4. The method of reducing the solubility of the product produced in accordance with claim 1, by raising the pH of an aqueous solution of the N-methylol polyamide with a base to about 10.

5. The method of reducing the solubility of the product produced in accordance with claim 1, by heating the N-methylol polyamide to above 120° C.

6. The method of rendering the product produced in accordance with claim 1 water insoluble and relatively infusible, wherein the N-methylol polyamide is heated in the presence of an acid.

7. The method of preparing water-soluble N-methylol polypyrrolidone which comprises heating at a temperature between 85° C. to 200° C. a reaction mixture consisting of a polypyrrolidone in an aqueous formaldehyde solution of 10% to 50% strength under pH conditions between 3.5 to 8.

8. The method of claim 4 wherein the N-methylol polypyrrolidone is recovered from the reaction mixture by removing the water and excess formaldehyde.

9. The method of claim 4 wherein the resulting N-methylol polypyrrolidone is precipitated from the reaction mixture by adding acetone.

References Cited

UNITED STATES PATENTS

| | | | |
|---|---|---|---|
| 2,288,279 | 6/1942 | Hopff et al. | 260—78 |
| 2,393,972 | 2/1946 | Cairns | 260—78 |
| 2,412,993 | 12/1946 | Larchar | 260—78 |
| 2,430,860 | 11/1947 | Cairns | 260—72 |
| 2,430,866 | 11/1947 | Foster et al. | 260—78 |
| 2,430,867 | 11/1947 | Foster et al. | 260—72 |
| 2,430,875 | 11/1947 | Hallowell et al. | 260—72 |
| 2,430,910 | 11/1947 | Charch | 260—72 |
| 2,430,923 | 11/1947 | Foster et al. | 260—72 |
| 2,443,486 | 6/1948 | Watkins | 260—72 |
| 2,734,004 | 2/1956 | Robinson | 260—78 |

WILLIAM H. SHORT, *Primary Examiner.*

H. D. ANDERSON, *Assistant Examiner.*